Patented May 12, 1942

2,283,035

UNITED STATES PATENT OFFICE 2,283,035

PROCESS FOR THE MANUFACTURE OF
1,4,5,8-TETRAAMINOANTHRAQUINONE

Pierre Bludow, Lyon, France, assignor to Societe
"Rhodiaceta," Paris, France

No Drawing. Application December 23, 1938, Serial No. 247,405. In France December 24, 1937

4 Claims. (Cl. 260—378)

The present invention relates to a new process for the manufacture of 1,4,5,8-tetraamino-anthraquinone from the corresponding 1,4,5,8-chloro-compound.

1,4,5,8-tetraamino-anthraquinone is a dye very much used in the dyeing of cellulose esters and ethers. Anthraquinone being a raw material of high and fluctuating price, it is of great interest to simplify as much as possible the process for obtaining tetraaminoanthraquinone so that the latter may be at a reasonable price.

From this point of view processes involving successive nitrations and reductions are rather inconvenient as they are long and the yield rather small, owing to several isomers being obtained simultaneously, which have to be separated in order to obtain a dye of a good shade.

Various other processes have been described for preparing first 1,4,5,8-tetrachloranthraquinone, which is then treated with an imide of a di-carboxylic acid such as phthalimide or succinimide and then by a hydrolysing agent. These imides are not used very generally in industry, which thus generally involves the creation of a small special auxiliary manufacture.

According to the present invention it has been found that the manufacture of 1,4,5,8-tetraaminoanthraquinone from 1,4,5,8-tetrachloranthraquinone is very easily effected by condensation with a very easily accessible industrial product, namely paratoluenesulphonamide. The condensation product is then treated with a hydrolysing agent in the known manner, which sets free the tetraaminoanthraquinone.

The simplest method of obtaining 1,4,5,8-tetrachloranthraquinone is the direct chlorination of anthraquinone by chlorine. By suitably selecting the conditions of this chlorination 1,4,5,8-tetrachloranthraquinone is obtained directly as has already been described with excellent yields. This tetrachloranthraquinone crystallises directly from the medium in which it is obtained and after simple washing it is ready for the condensation.

The following example illustrates how the invention may be carried out in practice, but the invention is in no way limited to this example. The parts throughout are by weight.

Example

A. *Preparation of 1,4,5,8-tetrachloranthraquinone.*—100 parts of anthraquinone are dissolved in 1000 parts of sulphuric acid monohydrate, with 2 parts of iodine. The whole is heated to 130° C. and a current of finely divided chlorine is passed through the mixture. 1,4,5,8-tethachloranthraquinone crystallises out as it is formed. It is separated by filtration and purified by washing with sulphuric acid of 66° Bé. By washing with hot water and then with sodium carbonate solution, which eliminates sulphuric acid, the product is obtained ready for use.

B. The condensation with paratoluenesulphonamide is effected in the following manner:

| | Parts |
|---|---|
| Tetrachloranthraquinone | 5 |
| Potassium carbonate | 10 |
| Paratoluenesulphonamide | 12 |
| Copper acetate | 0.2 |
| Copper powder | 0.1 |
| Nitrobenzene | 50 | are placed in a suitable receptacle.

The mixture is heated for 5 hours at 210 to 220° C. The nitrobenzene is then removed in a current of steam. This operation being completed the black residue is dissolved in 110 parts of sulphuric acid of 66° Bé. and heated for 2 hours at 100° C. Precipitation is effected in 500 parts of water. The sulphate of tetraaminoanthraquinone is precipitated and filtered; the base is liberated on the filter itself with the help of caustic soda and then washed with water until neutral reaction.

Naturally the tetraaminoanthraquinone thus obtained can be treated in any suitable manner for subsequent use. It can, in particular, be dried in a pure state or substances intended to facilitate its subsequent dispersal in dye baths according to known methods may be added before drying.

What I claim and desire to secure by Letters Patent is:

1. A process for the preparation of 1,4,5,8-tetraaminoanthraquinone consisting in causing 1,4,5,8-tetra-chloranthraquinone to react in an inert solvent with paratoluene sulphonamide in the presence of copper powder and copper acetate constituting catalyzing means and then hydrolysing the condensation product thus obtained.

2. A process for the preparation of 1,4,5,8-tetraaminoanthraquinone consisting in causing 1,4,5,8-tetra-chloranthraquinone to react in nitro-benzene with paratoluene sulphonamide in the presence of copper powder and copper acetate constituting catalyzing means and then hydrolysing the condensation product thus obtained.

3. A process for the preparation of 1,4,5,8-tetraaminoanthraquinone comprising the steps of placing in a suitable receptacle 5 parts of 1,4,5,8-tetrachloranthraquinone, 10 parts of potassium carbonate, 12 parts of paratoluenesulphonamide, 0.2 part of copper acetate, 0.1 part of copper powder and 50 parts of nitrobenzene, heating the resulting mixture for about 5 hours at about 210° to 220° C., removing the nitrobenzene, dissolving the residue in about 110 parts of sulphuric acid, heating the resulting solution for about 2 hours at about 100° C., adding about 500 parts of water to the solution, separating the precipitated sulphate of tetra-aminoanthraquinone by filtration and treating with caustic soda, and washing the resulting base with water until a neutral reaction is obtained.

4. A process for the preparation of 1,4,5,8-tetraaminoanthraquinone consisting in causing 1,4,5,8-tetra-chloranthraquinone to react in an inert solvent with paratoluene sulphonamide in the presence of potassium carbonate, and in the presence of copper powder and copper acetate constituting catalyzing means, and then by hydrolyzing the condensation product thus obtained.

PIERRE BLUDOW.